M. P. Norton.
Post Office Stamp.

No. 1748. Reissued Aug. 23. 1864.

Witnesses.
Benj. H. Hall
C. L. Atwn.

Inventor.
Marcus P. Norton

UNITED STATES PATENT OFFICE.

JACOB SHAVOR AND ALBERT C. CORSE, OF TROY, NEW YORK, ASSIGNEES OF MARCUS P. NORTON.

IMPROVEMENT IN POST-OFFICE STAMPS.

Specification forming part of Letters Patent No. 38,175, dated April 14, 1863; Reissue No. 1,748, dated August 23, 1864.

*To all whom it may concern:*

Be it known that MARCUS P. NORTON, of the city of Troy, county of Rensselaer, and State of New York, invented new and useful Improvements in Postmarking Letters, Packets, &c., and Canceling the Postage-Stamp thereon, in the manner and by the means substantially as hereinafter described and set forth; that the same were duly assigned and transferred to the undersigned, JACOB SHAVOR and ALBERT C. CORSE on the 20th day of April, 1863, and recorded in the United States Patent Office on the 8th day of March, A. D. 1864, Liber C[7], page 458, of Transfer of Patents; and we do hereby declare the following to be a full, clear, and exact description of the construction and operation thereof, reference being hereby had to the accompanying drawings, and to the letters of reference marked thereon, which drawings make a part of this specification.

Like letters refer to and represent like or corresponding parts.

Figure 1:
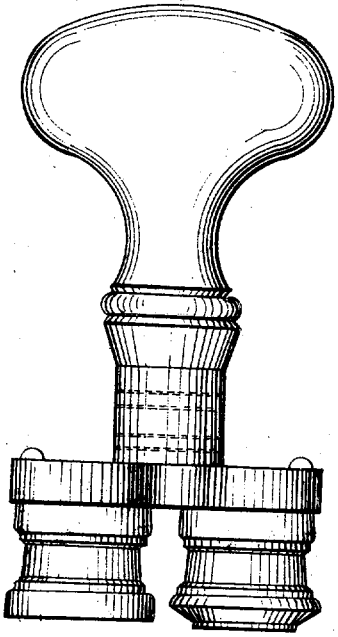
Figure 2:
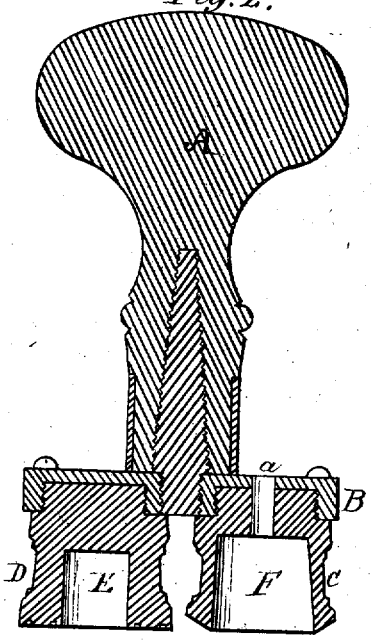
Figure 3:
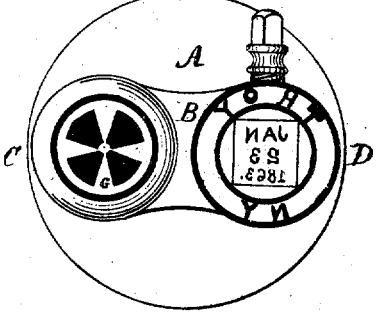
Figure 4:
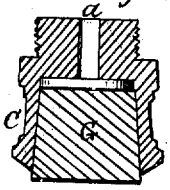
Figure 5:
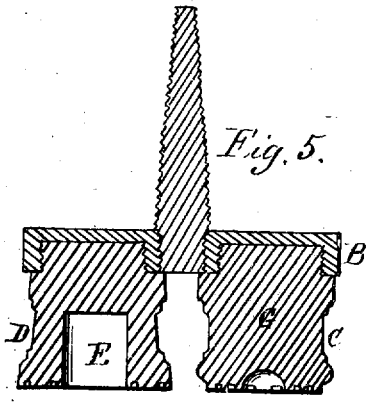
Figure 6:
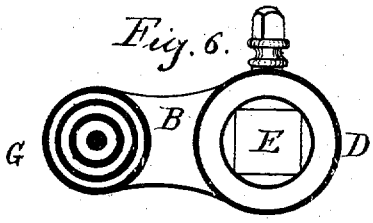
Figure 7:
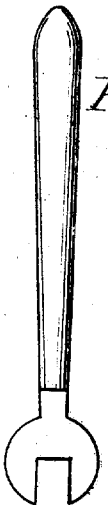
Figure 8:
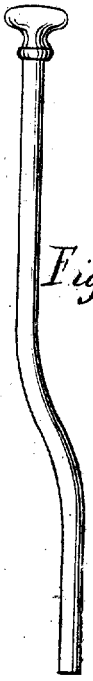

Figure 1 is a side elevation of the postmarking and postage-stamp-canceling device, hereinafter described and set forth, for canceling stamps issued by the Post-Office Department, with indelible or other ink, at the same time and operation of the making of the postmark on the packet one side of such frank or postage-stamp so canceled. Fig. 2 is a vertical section taken through the center of the various parts of the postmarking and postage-canceling device herein described and set forth. Fig. 3 is a face view showing the postmarking-stamp ready for use, and the postage-canceling stamp or device made of wood, cork, rubber, or other and similar material, and therein inserted and more fully described hereinafter. Fig. 4 shows a device to cancel postage-stamps or letter-franks, with indelible or other ink, by means of wood, cork, rubber, or any elastic or similar material, for type or blotter, which may be used for that purpose separate and alone, or in combination with the postmarking device, substantially as shown at Fig. 3. Fig. 5 is a vertical section of a post-marking and canceling postage-stamp device combined, and entirely made of iron, steel, or similar material, and described hereinafter more fully. Fig. 6 is a plan or face view of Fig. 5, and fully showing the postage-canceling device made of iron, steel, or other similar material. Fig. 7 shows the wrench for securing the type for the month, day of month, and year in the postmarking device. Fig. 8 shows the punching tool or device for forcing the cork, wood, rubber, or similar material, from the tube in which the same is held for use, so as to repair or replace the same with a similar blotter or postage stamp-canceling device.

The nature of the said invention and improvements herein described consists in the employment and combination of a device for the more complete and perfect cancellation of postage-stamps by means of wood, cork, rubber, or similar material, whereby such stamps are blotted or effaced with indelible or other ink, in the manner substantially as herein described and set forth.

It also consists in the combination of a postage-canceling device, having wood, cork, rubber, or any similar material for the type or blotter, with any postmarking device, so as to blot, cancel, or efface postage-stamps, with indelible or other ink, at the same time, blow, or operation of the instrument by which the postmark is made upon the letter, envelope, or packet, substantially as herein described and set forth.

It also consists in the postmarking of letters, envelopes, or packets, and in the cancellation of postage stamps thereon with ink or similar material by means of wood, cork, rubber, steel, iron, or any other suitable material, so combined with the postmarking instrument as to blot or efface such postage-stamps at the same blow or operation of the instrument thus constructed for such purpose.

To enable others skilled in the art to which said invention or improvements relate to make and use the same, we will here proceed to describe the construction and operation thereof, which are as follows, to wit:

We construct the postmarking device or stamp D of any suitable material, and of any size in diameter required, while in length it must correspond to the canceling device herein described. E, Fig. 3, is the mortise or recess, of suitable dimensions to receive the type for the month, day of the month, and the year, around which is the name of the place where used, and is similar to the postmarking device described and set forth in our Letters Patent bearing date the 16th day of December, 1862, which was issued to the said MARCUS P. NORTON, and by him afterward assigned and transferred to us, and which said type is secured to the cross-piece B in the same manner and by the same means as described and set forth in the said patent, as well as in this specification hereinafter.

We construct the postage-canceling stamp or device G for the purpose of canceling in a more perfect and thorough manner the postage-stamps on letters, packets, &c., of wood, cork, rubber, or any similar or elastic material, and insert the same in the tube or recess F, which is in that part of the canceling device C connected to and combined with the said cross-piece B, as herein described. The said tube or recess F, Figs. 2, 3, and 4, may be of any diameter or depth desired. We prefer to have the diameter thereof at least the same as the width of the postage stamp to be canceled or destroyed with ink, as aforesaid. The said canceling device G will of course be so made as to correspond with such tube or recess and to closely fit the same, and may be made of cork, wood, rubber, or any elastic material, as aforesaid. The face of this device may contain a plan or form for canceling postage-stamps with ink, like that shown at Fig. 3, or it may have any configuration deemed proper to use for the purpose aforesaid. This device G will project somewhat below the lower end of the said tube F, as seen at Figs. 1 and 4, and it may also project somewhat below the face of the postmarking or rating device D, if deemed best so to do, and it may be driven out of the said tube or recess F by means of a pin or bolt, substantially like that shown at Fig. 8, the lower end of which operates in and through the hole *a*, Figs. 2 and 4, for the purpose of repairs, or to replace it by a new one. A is the handle firmly secured to the cross-bar B.

The said postage-stamp-canceling device G, being thus constructed with cork, rubber, or other elastic material, for the type or blotter, and combined with the said device C, with recess F therein, as aforesaid, will receive and hold on the face or configuration thereof ink in quantities sufficient to permanently blot, efface, and cancel the postage-stamp whereon the same is used, in such manner as to prevent the said postage-stamp being cleansed of the said canceling-ink by any chemical or other process, for the said ink so put on would be so effectual that any attempt to remove it therefrom would entirely destroy the said postage-stamp, and thereby render the same incapable of a second or other use without immediate detection. The said cork, rubber, or other elastic material, as aforesaid, will render the said stamp and canceling device of an easy and rapid use, for there being a yielding of the same when the blow is given the operator will not tire as soon by a constant or continued use of the same, and it will somewhat aid in raising the entire apparatus from the paper and postage-stamp when the impression and cancellation shall have been given by the operator. The said type, blotter, or canceling device can be easily repaired or replaced by a new one at very little expense or trouble. The said cork, rubber, wood, or elastic device for canceling postage-stamps, as aforesaid, may extend upward to the said cross-bar B and then be connected to the same by means of a screw, pin, bolt, or similar device, if desired. The operation and effect produced would in such case be the same. The said postage-canceling device may be of any desired distance from the said post marking or rating device, or it may be securely fastened to the immediate side of the said post marking or rating part or stamp by any proper and sufficient means.

The said postage-canceling device may also be made of iron, steel, or similar material, as shown at G′, Figs. 5 and 6, which may be secured to the said cross-piece B in like manner as the said device C, Figs. 2 and 4, which is done either by screw and nut when the same unites with the said cross-bar, or it may there be firmly fastened by means of pins or rivets or solder, as deemed best. The said post marking or rating device is secured to said cross-bar B in like manner, and by substantially the same means. The said metal canceling device G′, Figs. 5 and 6, may also be fastened to the immediate side of the said postmarking device by any good and sufficient means, as hereinbefore described in reference to the said device C, Figs. 2 and 4. This metal device may also have upon its face or lower surface any configuration deemed best for the purpose of canceling the postage-stamp in ink at the same blow of the instrument or apparatus, as hereinbefore stated.

In every case the postmarking of the letter or packet and the effacing or cancellation of the postage-stamp thereon is done at the same time and at one operation of the devices, constructed and combined substantially as herein described and set forth.

Both the postmark and the cancellation of the said postage-stamp are done with indelible or other kind of ink and without any injury to the said letter, envelope, or packet, or the contents thereof, as would be the case were the said postage-stamp canceled by being cut in several places by means of cutters or knives constructed for that purpose. The instrument and devices herein described will not cut either the letter, envelope, or postage-stamp thereon, but performs the cancellation aforesaid with ink only, as aforesaid. No cutting device, whatever, is used.

In no case could any fraud be committed by a second or re-use of the Government postage-stamp or frank without being immediately discovered. This combination of devices will greatly facilitate the making up of mails for transportation, will reduce the labor in postmarking letters and in canceling the postage-stamps thereon to about one-half of that required when this combined instrument is not used. It therefore saves about one-half of the labor in the postmarking of letters and in the cancellation of the postage-stamps thereon. It also makes the cancellation of the said postage-stamps more effectual so as to prevent a second or re-use by any means whatever, which are very important items in the successful management of the post offices in this country, whereby large sums of money are annually saved this Government.

Having thus described the original invention and improvements of the said MARCUS P. NORTON in postmarking and canceling devices combined as and for the purposes aforesaid, what we claim, and desire to secure by Letters Patent of the United States of America, is—

1. The postage-canceling device C, with wood, cork, or rubber type or blotter, G, therein, or any equivalent therefor, so as to cancel, blot, or efface the postage-stamp with indelible or other ink, in the manner and for the purposes substantially as herein described and set forth.

2. The canceling device C, with wood, cork, or rubber, or any equivalent thereof, forming the type or blotter G therein, in combination with the cross-piece B and with the postmarking device D, substantially as and for the purposes herein described and set forth.

3. The post marking of letters, envelopes, and packets, and the cancellation of the postage-stamps thereon with ink at one and the same blow or operation of the instrument, in the manner and by the means substantially as herein described and set forth.

4. The employment and combination of postmarking device with postage-stamp-canceling device, both being operated by one or the same handle, for the postmarking the letter, envelope, or packet, and for the destruction of postage-stamps thereon with indelible or other ink, substantially as herein described.

In testimony whereof we have on this 27th day of May, A. D. 1864, hereto set our hands.

JACOB SHAVOR.
ALBERT C. CORSE.

Witnesses:
BENJ. H. HALL,
C. L. ALDEN.